Dec. 11, 1923.

E. BREITLING

CASH REGISTER OR CALCULATING MACHINE

Filed March 10, 1922     8 Sheets-Sheet 1

1,477,420

Dec. 11, 1923.

E. BREITLING 1,477,420

CASH REGISTER OR CALCULATING MACHINE

Filed March 10, 1922  8 Sheets-Sheet 2

Inventor:
Ernst Breitling

Dec. 11, 1923.

E. BREITLING

CASH REGISTER OR CALCULATING MACHINE

Filed March 10, 1922 — 8 Sheets-Sheet 3

Inventor:
Ernst Breitling

Dec. 11, 1923.                    1,477,420
E. BREITLING
CASH REGISTER OR CALCULATING MACHINE
Filed March 10, 1922       8 Sheets-Sheet 4

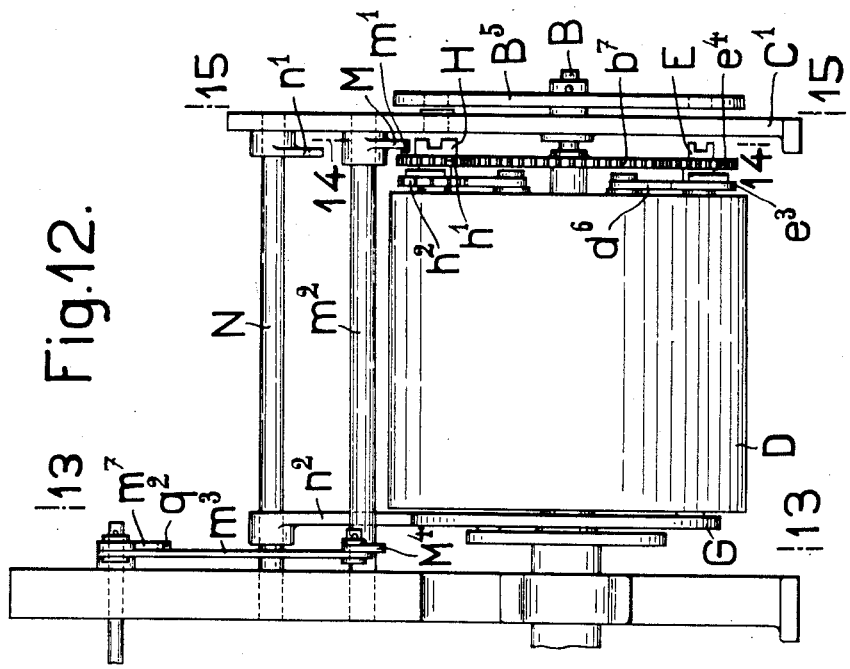
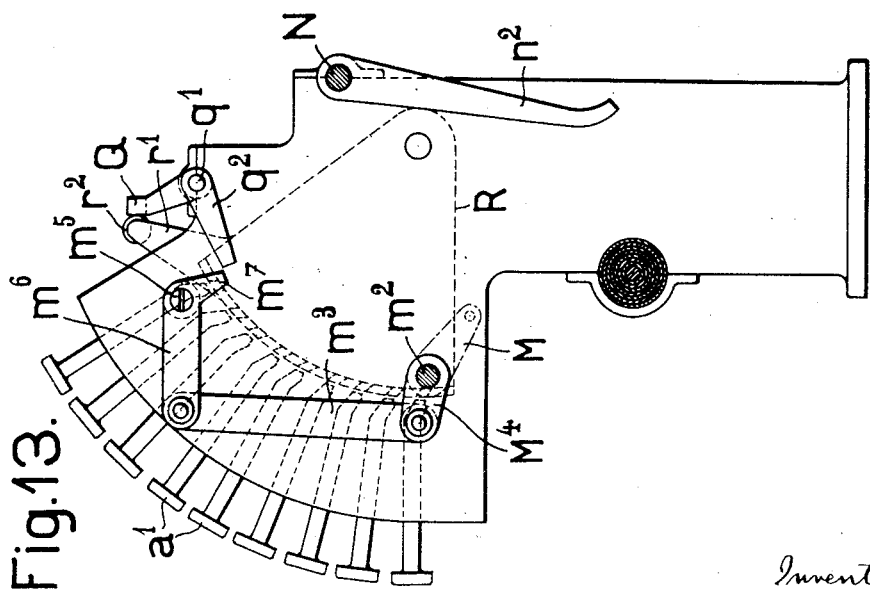

Dec. 11, 1923. 1,477,420
E. BREITLING
CASH REGISTER OR CALCULATING MACHINE
Filed March 10, 1922  8 Sheets-Sheet 6
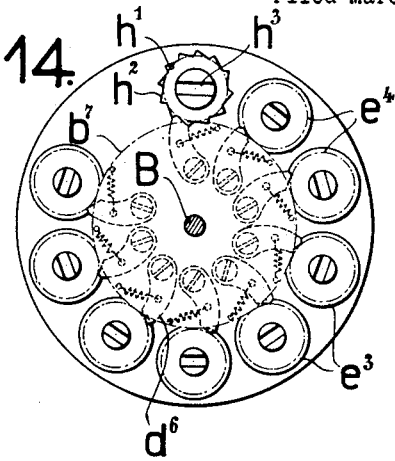
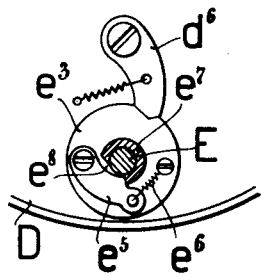
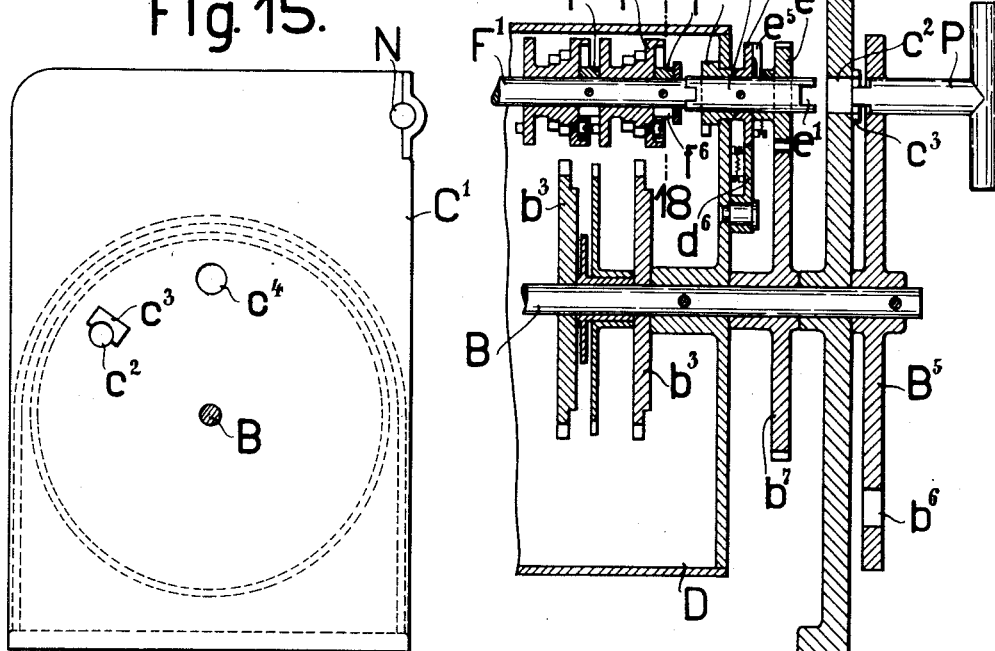
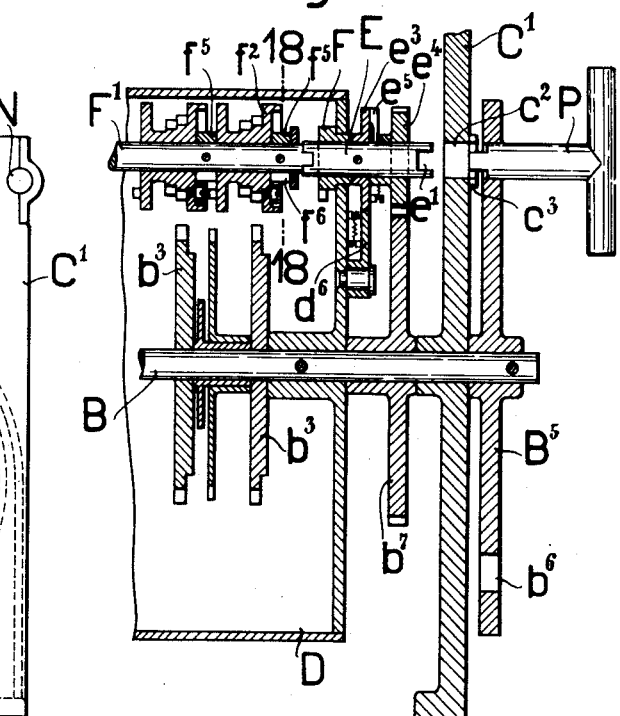
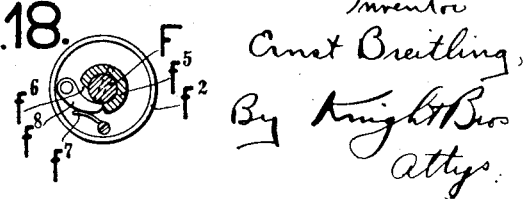

Dec. 11, 1923.    1,477,420
E. BREITLING
CASH REGISTER OR CALCULATING MACHINE
Filed March 10, 1922    8 Sheets-Sheet 7

Inventor
Ernst Breitling
By Knight Bros
Attys

Patented Dec. 11, 1923.

1,477,420

UNITED STATES PATENT OFFICE.

ERNST BREITLING, OF ESSEN, GERMAN, ASSIGNOR TO FRIED. KRUPP AKTIENGE-SELLSCHAFT, OF ESSEN-ON-THE-RUHR, GERMANY.

CASH REGISTER OR CALCULATING MACHINE.

Application filed March 10, 1922. Serial No. 542,765.

*To all whom it may concern:*

Be it known that I, ERNST BREITLING, residing at Essen, Germany, a citizen of the German Republic, have invented a certain new and useful Improvement in Cash Registers or Calculating Machines, of which the following is a specification.

This invention relates to cash registers or calculating machines of the type in which the totalizing counters are arranged in a drum, one of the totalizing counters having to be coupled with the operating mechanism of the cash register each time the machine is properly operated.

In order to couple one of the totalizing counters with the operating mechanism in the well-known cash registers of this kind, it was necessary to rotate the drum and thereby bring the respective totalizing counter into engagement with the driving device connected with the operating mechanism. In case this rotation of the drum was effected by means of the operating mechanism of the machine, violent shocks were caused by the high force of inertia of the drum containing the totalizing counters, on account of the considerable weight and the high velocity of these parts.

Now, according to the invention, provision is made for coupling the totalizing counter selected for a certain registering operation, with the operating mechanism in such a manner that the drum need not be rotated. To this end, the normally stationary drum is provided with counting disks which are rotatable independently of the drum; these disks take part in the counting motion of the setting members of the machine and are engaged by the selective totalizing counter when the machine is operated. Rotation of the drum is only necessary in the new cash register for the purpose of reading the totalizing counters or setting them to zero.

Cash registers are already old, in which a casing of a substantially sector shaped cross-section carries swingingly arranged totalizing counters which are liable to be coupled, for the purpose of totalizing, with counting disks which are mounted in the casing and which take part in the totalizing motion of the setting members of the machine. This old arrangement is not applicable to a large number of totalizing counters.

The accompanying drawings illustrate, by way of example, a preferred embodiment of the invention.

Fig. 12 represents a front view of the drum and appurtenant parts,

Fig. 13 is a section on line 13—13 in Fig. 12,

Fig. 14 is a section on line 14—14 in Fig. 12,

Fig. 15 is a section on line 15—15 in Fig. 12, all looking from the right.

On a larger scale:

Fig. 16 shows a part of Fig. 14 in section,

Fig. 17 is a longitudinal section through a portion of the drum and one of the adding mechanisms mounted on the drum.

Fig. 18 is a section on line 18—18 of Fig. 17 looking from the right.

Figure 1:
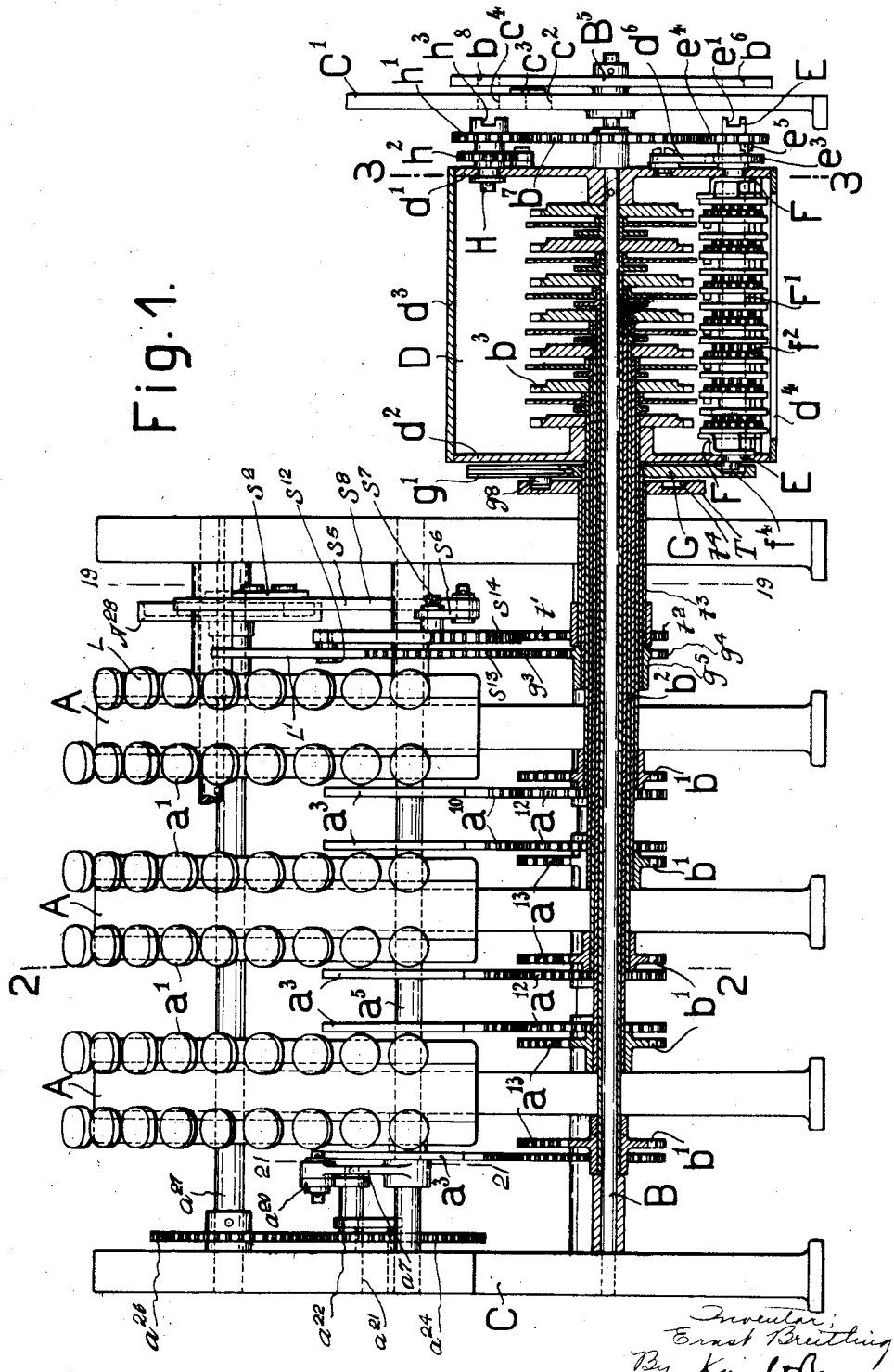
Fig. 1 is a front elevation of the cash register, the drum being shown in longitudinal section and several parts being omitted for the sake of clearness.
Figure 19:
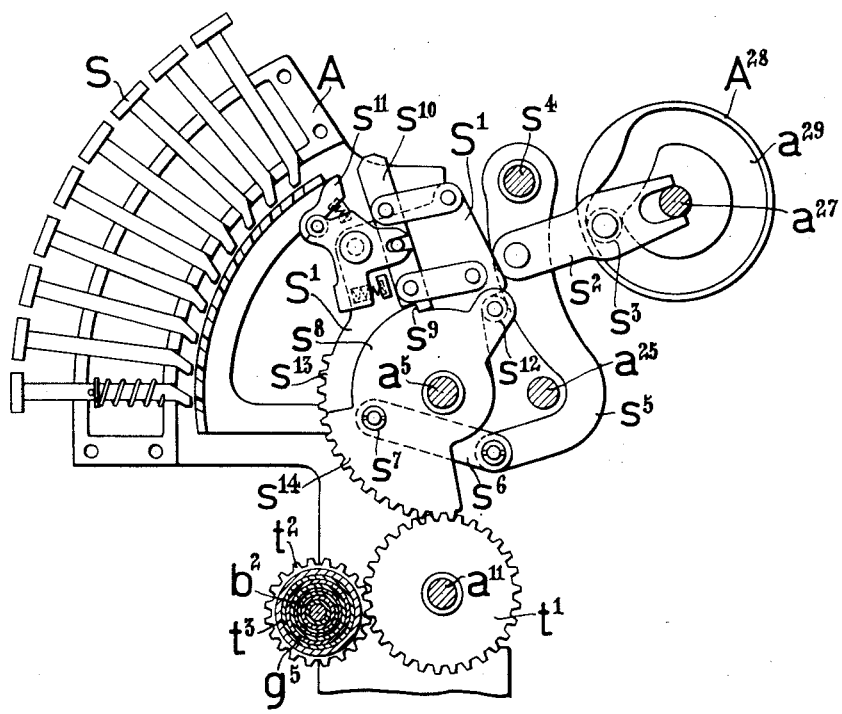
Figure 20:
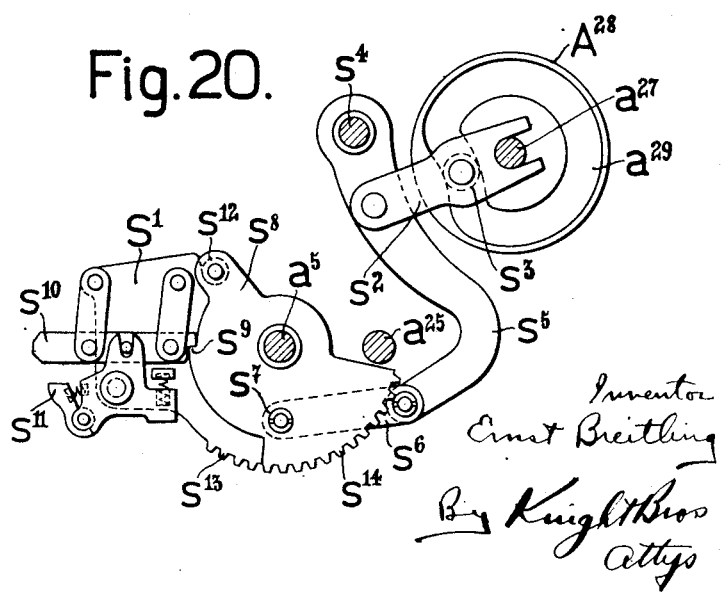
Figure 21:
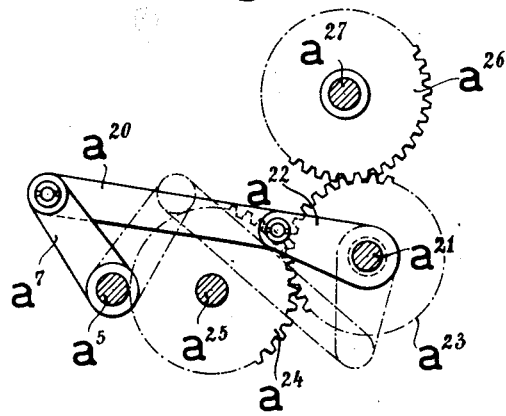
Figure 22:
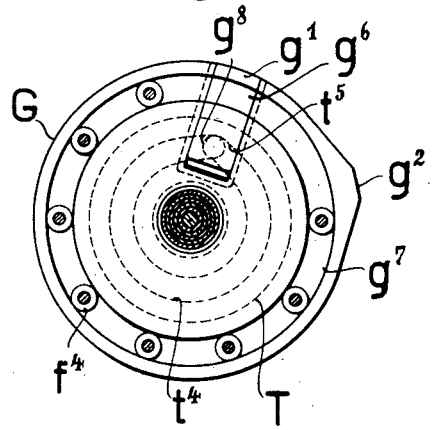
Figure 23:
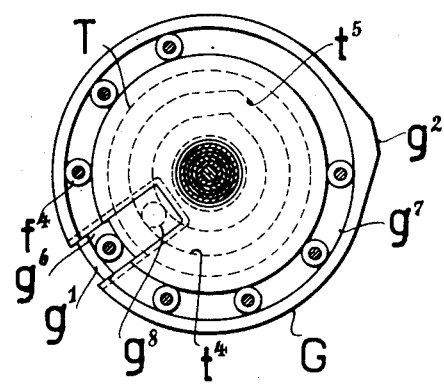

Fig. 19 is a section on line 19—19 of Fig. 1,

Fig. 20 is a view corresponding to Fig. 19 with some of the parts in a different position, and, Fig. 21 is a section on the line 21—21 of Fig. 1, these sections being seen from the right, Fig. 22 shows the apparatus for throwing the totalizing counters into and out of operation in the idle position, and Fig. 23 shows the same apparatus, a totalizing counter being thrown into operation.

Figure 2:
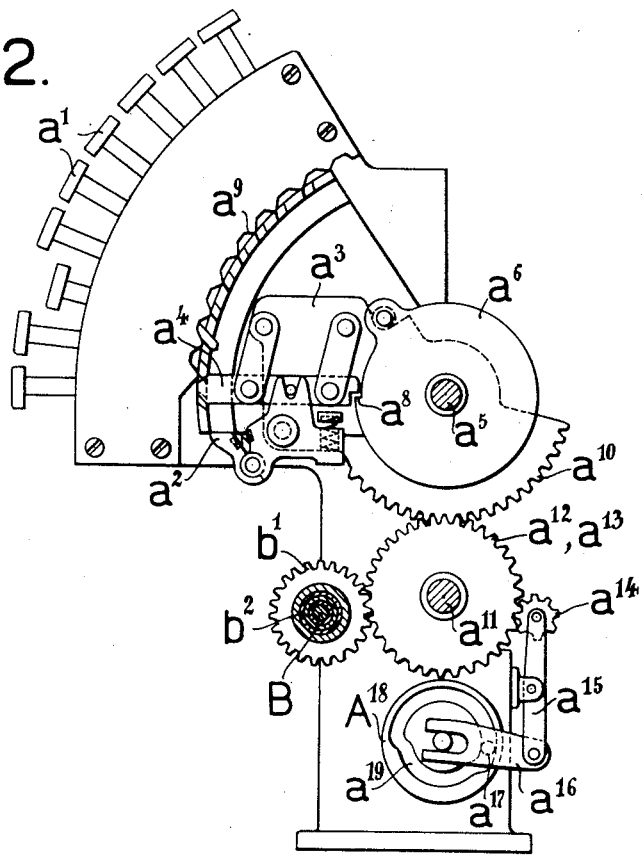
Fig. 2 is a section on the line 2—2 of Fig. 1.
Figure 3:
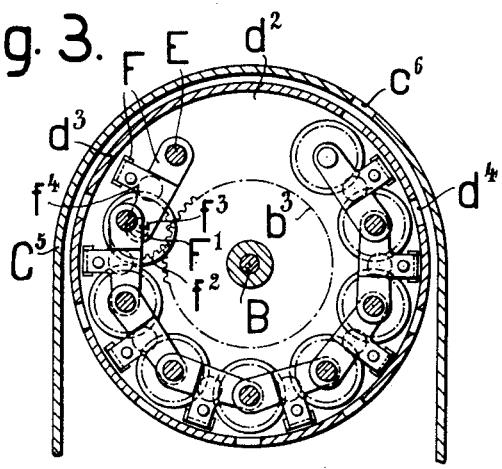
Fig. 3 is a cross-section of the drum on the line 3—3 of Fig. 1.
Figure 10:
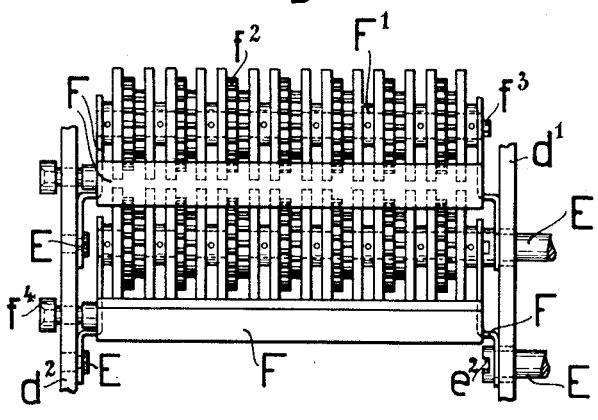
Fig. 10 is a rear elevation of a portion of the drum, on a somewhat enlarged scale.
Figure 11:
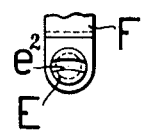
Fig. 11 is a detail of Fig. 10.

Referring now to the drawings, in which similar characters of reference denote the same parts, A designates the key-banks in which are mounted the amount keys $a^1$ (Fig. 2) which cooperate with feelers $a^2$ of the setting bolts $a^4$ which are pivoted to the setting disks $a^3$. The setting disks $a^8$ are mounted to rotate loosely on a shaft $a^5$ and they are adjusted by means of driver disks $a^6$ which are rigidly connected to the shaft $a^5$ and to which an oscillatory movement is imparted by a thrust crank gear each time the cash register is operated. The crank gear has a crank $a^7$ (Figs. 1 and 21) which is mounted on the shaft $a^5$ and is connected by a rod $a^{20}$ to a crank $a^{22}$ mounted on a short shaft $a^{21}$. The shaft $a^{21}$ which is mounted in the casing wall C is positively connected by gear wheels $a^{23}$ $a^{24}$ to the actuating shaft $a^{25}$ and makes one revolution each time the cash register is operated. The driver disk $a^6$ has a nose $a^8$ (Fig. 2), which, on the upward movement of the disk, engages the setting bolt $a^4$ and carries the setting disk $a^3$ with it, until by the feeler $a^2$ striking against the tail of the depressed key, the setting bolt $a^4$ will be disengaged from the nose $a^8$ of the driver disk $a^6$ and brought into engagement with a series of teeth $a^9$ of the key-bank thereby locking the setting disk $a^3$. Each setting disk $a^3$ has a toothed portion $a^{10}$ which is in mesh with a pinion $a^{12}$ rotatably mounted on a shaft $a^{11}$ and adapted to be coupled with a pinion $a^{13}$ of the same size by means of a rockingly arranged pinion $a^{14}$. The pinion $a^{13}$ is likewise mounted for rotation on the shaft $a^{11}$. The pinion $a^{14}$ is carried by a lever $a^{15}$ which is being rocked by means of a guiding rod $a^{16}$ pivoted to the said lever. The rod $a^{16}$ carries a roller $a^{17}$ which is in engagement with a cam groove $a^{19}$ of a disk $A^{18}$ which will make one revolution each time the cash register is operated. Each pinion $a^{13}$ meshes with a pinion $b^1$. The pinions $b^1$ are fastened to the ends of hollow shafts $b^2$ which are inserted into one another (see Fig. 1). These hollow shafts surround a shaft B and project into the drum D. Fastened to the end of each hollow shaft $b^2$ in the interior of the drum D is a toothed counting disk $b^3$. The head wall $d^1$ of the drum which is fixed on the shaft B and the head wall $d^2$ which is freely rotatable on the outermost hollow shaft $b^2$, are rigidly connected with each other by means of the sheet metal shell $d^3$ which is provided with peep-slots $d^4$ (Figs. 1 and 3) for reading the totalizing counters. The head wall $d^1$ is provided with a notch $d^5$ (Figs. 4 to 6) which is made use of in locking the drum D as will be further described hereinafter. Nine pins E are mounted in each head wall of the drum D at nine succeeding corners 0 to 8 of a regular decagon. At the corners 0 to 7, a frame F (Figs. 1, 3 and 10) is swingingly mounted on every two oppositely arranged pins E which have a common axis, said frame F carrying the shaft $F^1$ of the wheels $f^2$ of the totalizing counters. The distance between the shaft $F^1$ and the bearing pins E of its carrier F is such that, when the totalizing counters are out of engagement with their operating means, the axis of each shaft $F^1$ coincides with the axis of the next following pin E. The pins E which are mounted in the head wall $d^1$ at the corners 1 to 8, are constructed as zero-setting pins. At the outer head face of the drum D, each of these pins E is provided with a straight slot $e^1$ for engagement by the key P (Fig. 17) used for individually setting the totalizing counters to zero position, while at the inner head face, said pins E are provided with an arc-shaped slot $e^2$ (Fig. 11) which is concentric with relation to the axis of the preceding pins E and in which is guided a correspondingly shaped pin $f^3$ of the totalizing counter shaft $F^1$ which is rockable with relation to the said pins E (see uppermost left totalizing counter Fig. 3). Owing to this arrangement, the shaft $F^1$ of the totalizing counter in question can freely perform the swinging motions which are necessary for throwing the wheels $f^2$ of the totalizing counters into or out of engagement with the counting disks $b^3$ and a rotation of the zero-setting pin E will be transmitted to the shaft $F^1$ when the totalizing counter is in disengaged position. The arrangement for throwing the totalizing counters into and out of operation is now to be described. The gear wheel $a^{23}$ mentioned above gears into a gear wheel $a^{26}$ of the same size (see Figures 1 and 21) which is mounted on a shaft $a^{27}$ which carries a disc $A^{28}$ having a cam groove $a^{29}$ (see Figures 19 and 20.) Since, as stated above, the gear wheel $a^{23}$ makes one revolution each time the cash register is operated, the disc $A^{28}$ will also make one revolution each time the cash register is operated. A roller $s^3$ mounted on a connecting rod $s^2$ engages in the cam groove $a^{29}$. The connecting rod $s^2$ is guided by one, fork-shaped end on the shaft $a^{27}$ and at the other end it is pivoted to a rock lever $s^5$ mounted on a shaft $s^4$. The free end of the lever $s^5$ is pivotally connected to a rod $s^6$, which is pivotally connected by a bolt $s^7$ to a driver disc $s^8$ mounted to rotate on the shaft $a^5$ and provided for a driving sector $S^1$ which is likewise mounted to rotate on the said shaft $a^5$.

By means of the above described gearing an oscillating movement is imparted to the driver disc $s^8$ each time the cash register is operated, and the cam groove $a^{29}$ is so formed that the complete oscillatory movement (upwards and downwards) of the special key driver disc $s^8$ takes place during the downward movement of the amount key driver discs $a^6$, said first-named complete movement of the driver disc $s^8$, consequently being completed prior to the counting movement of the amount key driving sector, which movement takes place on the upward oscillation. When the driver disc $s^8$ swings upwards, its nose $s^9$ catches against a setting bolt $s^{10}$ pivoted to a driving sector $S^1$ and carries the sector $S^1$ with it, until a feeler $s^{11}$ of the setting bolt $s^{10}$ strikes against the tail of a depressed special key S. When the driver disc $s^8$ moves downwards a pin $s^{12}$ mounted on it strikes against the sector $S^1$ and brings it back into the zero position.

Into the teeth $s^{13}$ of the sector $S^1$ gears an intermediate wheel $g^3$ (see Fig. 1) which rotates on the shaft $a^{11}$ and gears into a gear wheel $g^4$. This gear wheel is mounted on one end of a hollow shaft $g^5$ surrounding the outermost hollow shaft $b^2$ the other end of said shaft $g^5$ carrying a slotted disc G. In a corresponding manner, a cam groove disc T is positively connected to the driver disc $s^8$ by an intermediate wheel $t^1$ (see Figures 1 and 19) rotating on the shaft $a^{11}$ and engaging a series of teeth $s^{14}$ on the disc $s^8$, also by a gear wheel $t^2$ cooperating with the wheel $t^1$ and a hollow shaft $t^3$ surrounding the hollow shaft $g^5$.

A sliding block $g^1$ (see particularly Figures 22 and 23) is movable radially on the slotted disc G. The sliding block $g^1$ is provided with a segment-shaped groove $g^6$ which runs through it and completes an annular groove $g^7$, leading from both sides up to the sliding block and concentric with the hollow shaft $g^5$, into a closed ring which runs across the sliding block $g^1$ when this latter is in its extreme outer position (see Fig. 22). In this annular groove engage rollers $f^4$ mounted on the totalizing counter carriers F, so that by rotating the disc G the sliding block $g^1$ can be set either to the roller $f^4$ of a totalizing counter carrier or to the idle position (see Fig. 22).

The movement of the sliding block $g^1$ is effected by means of the portion $t^5$ of a cam groove $t^4$ $t^5$ provided in the disc T and in which a roller $g^8$ mounted on the sliding block $g^1$ engages. The portion $t^4$ of the groove $t^4$ $t^5$ runs concentric with the axis of the hollow shaft $t^3$. As long as the roller $g^8$ of the sliding block $g^1$ is in engagement with the portion $t^4$ of the groove, the sliding block is in its inner position. During this time the totalizing counter, the setting roller $f^4$ of which engages in the groove $g^6$ of the sliding block, is coupled to the counting discs $b^3$. If on the rotation of the disc T, the roller $g^8$ is moved into the portion $t^5$ of the groove $t^4$ $t^5$ the sliding block $g^1$ is moved radially and the totalizing counter carrier F rocked about the axis of the bolts E. Fastened to the end of the shaft B which extends beyond the casing wall $C^1$ to the outside, is a disk $B^5$ which possesses eight holes $b^6$ (Figs. 1 and 17) for the insertion of the key used for individually setting the totalizing counters to zero. These key-holes are co-axial with the zero-setting pins E. The casing wall $C^1$ is provided with a key-hole $c^2$ for the key for individual zero-setting in such a manner that, when the drum D is in its idle position, the key-hole lies intermediate the corners 0 and 1 on the circle containing the corners of the decagon. Formed adjacent to the key-hole $c^2$ on the wall $C^1$ is a projection $c^3$ (Figs. 15 and 17) which, upon rotation of the disk $B^5$ for purpose of adjusting the drum D for the individual zero-setting and reading of the totalizing counters, serves as stop for the key inserted into one of the key-holes $b^6$. The drum D is surrounded by a wall $C^5$, which is provided with a peep-slot $c^6$ for reading the adjusted totalizing counter. On each adding mechanism shaft $F^1$ are mounted, in addition to the number wheels $f^2$, in the usual way, sleeves $f^5$ (Figs. 17 and 18). Each sleeve $f^5$ is provided with a longitudinal groove $f^6$ in which engages, as the shaft $F^1$ rotates, a pawl $f^8$, carried by the number wheel $f^2$ and acted upon by a spring $f^7$ so that all of the wheels $f^2$ mounted on the shaft can be brought into zero-position by rotating the shaft. In order to limit the rotation of the zero-setting pin E when individually setting the totalizing counters to zero, a spring-influenced pawl $d^6$ (Figs. 1, 12, 14 and 16) is provided on the drum wall $d^1$ for each pin E, said pawl cooperating with a ratchet wheel $e^3$ fastened to the pin E.

For simultaneously bringing the totalizing counters into zero-position, each pin E is provided with a pinion $e^4$ (Fig. 1) which is constantly in mesh with a pinion $b^7$ that is rotatable on the shaft B. A pawl $e^5$, (Fig. 16,) carried by the locking disc $e^3$, can engage, under the influence of a spring $e^6$, in a longitudinal groove $e^8$ of the hub $e^7$ of the gear $e^4$, rotatably mounted on the pin E. When one of the adding mechanisms is set at zero, the pin E and the disc $e^3$ mounted on it, are turned in clockwise direction; the pawl $e^5$ slides on the hub $e^7$ without turning the gear $e^4$. But when, all the adding mechanisms being set at zero, the gears $e^4$ are turned in clockwise direction, their hubs $e^7$, after the pawl $e^5$ has fallen into the groove $e^8$ of the hubs $e^7$, carry the discs $e^3$ with them owing to said pawls $e^5$, so that the pin E also, and the adding mechanism shafts $F^1$ connected thereto, are turned in clockwise direction. The rotation of the pinion $b^7$ is effected by a pinion $h^1$ which is rigidly connected to a pin H mounted in the drum wall $d^1$ and to a ratchet wheel $h^2$ aranged on this pin. The pin H possesses a slot $h^3$ (see also Fig. 6) adapted to be engaged by a key used for the simultaneous zero-setting of the totalizing counters. When the drum D is in its idle position, the pin H lies co-axially to a key-hole $c^4$ of the casing wall $C^1$ as well as to a key-hole $b^8$ of the zero-setting disk $B^5$.

Figure 4:
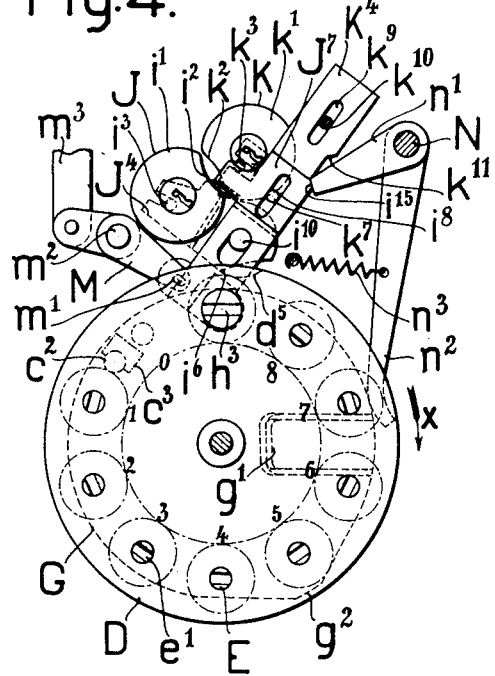
Fig. 4 is a side elevation of the drum and the corresponding locking devices.
Figure 5:
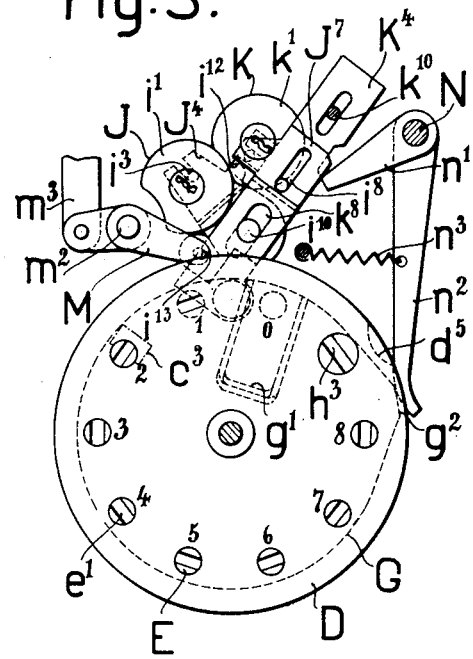
Figs. 5 and 6 are views similar to Fig. 4, representing different positions of the parts.
Figure 6:
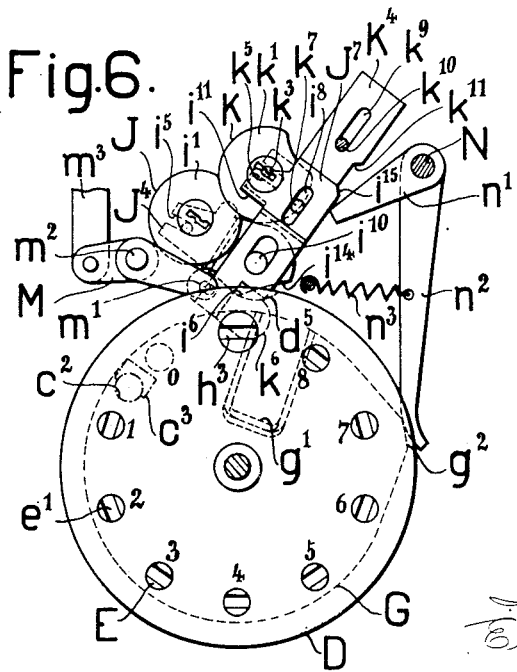
Figure 8:
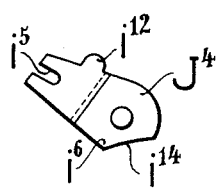
Figure 9:
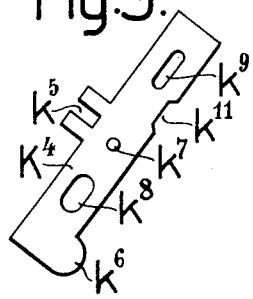

J and K (Figs. 4 to 6) are two locks serving to lock the drum D and comprising locking disks $i^1$ and $k^1$ adapted to be rotated each by means of a key. By unlocking the lock K, as hereinafter further explained, the key hole $c^4$ of the casing wall $C^1$ for the common zero positions, is uncovered and the lock J is locked in locking position, in which it prevents the drum D from turning. By the unlocking of lock J, the catch preventing the turning of the drum is released and the lock K blocked. Each locking disk possesses at its periphery a notch. The wall $i^2$ of the notch of the disk $i^1$ forms a cylindrical face the radius of which corresponds to the radius of the disk $k^1$ and which is situated coaxially with respect to the axis of the disk $k^1$ in the position of the parts illustrated in Fig. 4. In a similar manner, the wall $k^2$ of the notch of the disk $k^1$ constitutes a cylindrical face the radius of which is equal to that of the disk $i^1$ and which is situated coaxially with respect to the axis of the disc $k^1$ in the position of the parts illustrated in Fig. 4. Therefore, in the position of the parts according to Fig. 4, each of the two disks $i^1$, $k^1$ can be rotated, while after a rotation of one of the disks the other will be prevented from rotation in as much as the wall of its notch tightly bears against the unbroken portion of the periphery of the disk that has been rotated (Figs. 5 and 6). Thus, the two locks J, K can only be opened one at a time. The disk $i^1$ has an excentrically arranged pin $i^3$ which engages a slot $i^5$ of a latch $J^4$ (see also Fig. 8). When the lock J is closed and the drum D in idle position, a corner $i^6$ of the latch $J^4$ will engage the notch $d^5$ of the drum wall $d^1$, thereby locking the drum against rotation in the direction of the arrow $x$ (Fig. 4) for the purpose of reading or zero-setting. If the latch $J^4$ has been moved from the position according to Fig. 4 into the position according to Fig. 5 by a rotation of the locking disk $i^1$ for 180 degrees and the drum D has at the same time been rotated out of its idle position, the wall $i^{14}$ of a recess of the latch $J^4$ will bear against the cylindrical periphery of the drum wall $d^1$. The lock J will thus be locked in its open position and, on account of the afore-mentioned cooperation of the locking disks $i^1$, $k^1$, the lock K is locked in its closed position until the drum D has been returned to its idle position. The locking disk $k^1$ is provided with an excentrically arranged pin $k^3$ which engages a slot $k^5$ of a locking slide-plate $K^4$ (see also Fig. 9). When the lock K is closed, the lower end $k^6$ of said plate $K^4$ will cover the key-hole $c^4$ which is provided in the casing wall $C^1$ for the key used in simultaneously setting the totalizing counters to zero-position.

Figure 7:
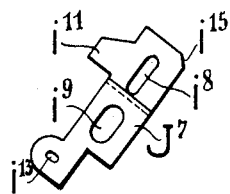
Figs. 7, 8 and 9 show details of the locking devices.

The slide-plate $K^4$ is provided with a pin $k^7$ projecting through a slot $i^8$ of another locking slide-plate $J^7$ (see also Fig. 7), a slot $i^9$ of which receives a pin $i^{10}$ which constitutes the axis of rotation of the latch $J^4$. A nose $i^{11}$ of the slide-plate $J^7$ is adapted to cooperate with a cam $i^{12}$ of the latch $J^4$ in such a manner that the rotation imparted to the latch $J^4$ upon opening the lock J by means of the pin $i^3$ of the locking disk $i^1$, will cause an outwardly directed shifting motion of the plate $J^7$. Projecting into a slot $i^{13}$ of the plate $J^7$ which slot lies in a right angle to the slots $i^3$, $i^9$ and to the direction of motion of the plate $J^7$, is a pin $m^1$ which is carried by an arm M fast on a shaft $m^2$ on which is secured another arm $M^4$ (Figs. 12 and 13,) which is connected by a link $m^3$ with a latch arm $m^6$, pivoted on a bolt $m^5$. By the unlocking of lock J, link $m^3$ is moved downwardly through parts $J^4$, $J^7$, $m^1$, M, $m^2$, $M^4$. Thereby a lug $m^7$ of the latch arm $m^6$ is swung into the path of an arm $q^2$, which is mounted on a shaft $q^1$, which carries a key-lock beam Q, against which bear rollers $r^2$, journalled on projections $r^1$, of the usual key-lock arms R. By depressing a key $a^1$, the corresponding arm R is raised, as usual, and the beam Q is swung rearwardly by the roller $r^2$ pressing against it. This swinging movement of the beam Q can only occur, however, when the projection $m^7$ of the latch arm $m^6$ is not in the path of the arm $q^2$. This is the case as long as the lock J is locked and thereby the drum D locked against rotation. The slide-plate $K^4$ is guided at the pin $i^{10}$ by means of a slot $k^8$ and at a pin $k^{10}$ by means of a slot $k^9$.

The following provision is made for holding the locks J, K in closed position. Mounted on a pin N of the cash register casing are a locking arm $n^1$ for the slide-plates $J^7$, $K^4$ and an arm $n^2$ which is under the action of a helical spring $n^3$ causing the free end of the arm $n^2$ to bear against the periphery of the slotted disk G which serves to set the totalizing counters and the periphery of which is provided with a cam $g^2$. When the cash register is operated for the purpose of registering, the slotted disk G will take a position in which the arm $n^2$ bears against a portion of its cylindrical periphery. At the same time, the arm $n^1$ will position itself in front of an oblique face $i^{15}$ of the slide-plate $J^7$ and engage a notch $k^{11}$ of the slide-plate $K^4$ so that the two locks J, K will be locked in closed position (Fig. 4). In order to disengage the totalizing counter coupled with the counting disks $b^3$ of the drum D in the previous operation of the cash register, an operation without any setting of amounts will have to be performed prior to the reading and setting of the counters to zero-position. As soon as the last-mentioned operation will have brought the slotted disk G into the zero-position, in which the sliding block $g^1$ is not adjusted to one of the rollers $f^4$ of the carriers F of the totalizing counters but to the idle position (Figs. 5 and 6), the cam $g^2$ of the disk G will be caused to actuate the arm $n^2$. The parts $n^2$, N, $n^1$ will thereby be moved contrary to the action of the spring $n^3$ in such a manner that the arm $n^1$ recedes from the path of the slide-plates $J^7$, $K^4$. The two locks J, K are then unlocked, so that each of them can be opened by turning the locking disk $i^1$ or $k^1$, respectively.

The operation of the arrangements described is as follows:

Each time the cash register is operated, the driver disks $a^6$ and the setting disks $a^3$ of the amount keys are first returned from the position they assumed during the previous operation of the cash register, into the lowermost, i. e. the zero-position. This operation will cause the following functions: The totalizing counter which is still in engagement with the counting disks $b^3$ of the drum D owing to the previous operation of the cash register, is disengaged; in the operations of the cash register performed for the purpose of registering, one of the eight totalizing counters is re-engaged with the counting disks $b^3$, this function taking place in connection with the setting of the sliding block $g^1$ of the slotted disk G to the roller $f^4$ of the frame F of the respective totalizing counter, while in each operation of the cash register without any setting of amounts and without any coupling of the totalizing counters, which operation is necessary prior to the zero-setting and reading of the totalizing counters, the sliding block $g^1$ is moved into its idle position and the cam $g^2$ of the disk G is adjusted for action on the arm $n^2$. When no special key S for one of the totalizing counters is depressed the sector $S^1$ is moved by the driver disc $s^8$ up to the uppermost position (see Fig. 19). In all other respects the action of the driver disc $s^8$ and the sector $S^1$, which forms the setting member of the cash register serving to select the totalizing counter is the same as that of the driver disc $a^6$ and the sector $a^3$ of the mechanism for setting the amount. The adjustment is however, effected by the operation of the cam groove $a^{29}$ so much more rapidly that the complete to and fro movement of the driver disc $s^8$ (downwards and upwards) has already been ended when the discs $s^6$ and the sectors $a^3$ have arrived in the zero position (below).

When the driver disc $s^8$ moves downwards the cam groove $t^5$ of the disc T positively connected to the driver disc $s^8$ moves the sliding block $g^1$ out of the inner position still assumed by it owing to the previous operation of the cash register so that any roller $f^4$ of a carrier F just in engagement with the groove $g^6$ of the sliding block $g^1$ is moved back into the path of the annular groove $g^7$ of the slotted disc G and the particular totalizing counter brought out of engagement with the counting discs $b^3$. Now when all the rollers $f^4$ of the carriers F have been brought into the path of the annular groove $g^7$ of the disc G the rearward rotation of the disc G can take place which is effected by the contact of the pin $s^{12}$ with the sector $S^1$ positively connected to the disc G. After the sector $S^1$ and the driver disc $s^8$ have been returned to the lowest position (see Fig. 20) the disc $s^8$ is again moved upwards by the reversal of the thrust crank gear, the setting bolt $s^{10}$ of the sector $S^1$ being carried along by the nose $s^9$ of the disc $s^8$ until its feeler $s^{11}$ strikes against the tail of the depressed special key S, thereby being released from the driver disc $s^8$ and locked. By this adjustment of the sector $S^1$ and of the slotted disc G positively connected to it, the sliding block $g^1$ is set to the totalizing counter carrier corresponding to the depressed special key, after which the cam disc T which is moved further on to the uppermost position moves the sliding block $g^1$ inwards by means of the groove portion $t^4$ and the roller $g^8$, and throws the selected totalizing counter into gear with the counting disc $b^3$. Now by coupling the gear wheels $a^{12}$, $a^{13}$ the positive connection of the amount key sectors $a^3$ with the corresponding counting discs $b^3$ is effected, which sectors have been moved downwards in the meantime, these sectors then being set by the upward movement of the driver discs $a^6$. If, now, the driver disks $a^6$ are swung upwards, the setting bolts $a^4$ of the setting disks $a^3$ of the amount keys will be raised along with and disengaged from the driver disks and locked by the striking of the feeler $a^2$ against the tail of the depressed key $a^1$. The counting motion of the setting disks $a^3$, thus limited, will be transmitted to the counting disks $b^3$ which have been positively connected with the setting disks $a^3$ by the throwing-in of the coupling pinion $a^{14}$ (Fig. 2), and the counting disks $b^3$, on their part, transmit said motion to the pinions $f^2$ of the totalizing counter which is in engagement with the counting disks.

If the cash register is operated for the purpose of totalizing, the drum D is being locked in as much as, on account of the setting of the sliding block $g^1$ of the disk G to one of the totalizing counters, the cam $g^2$ of the disk G will be correspondingly removed from the arm $n^2$, and the arm $n^1$ which, under the action of the spring $n^3$, engages the notch $k^{11}$ of the slide-plate $K^4$, will lock the slide-plate $J^7$ and the latch $J^4$. The corner $i^6$ of the latch $J^4$ is thus held in the notch $d^5$ of the drum wall $d^1$ and, besides, the lock J is locked. As the arm $n^1$, when in this position also holds the slide-plate $K^4$, the lock K will likewise be locked.

Upon the special operation of the cash register which is necessary prior to every zero-setting and reading of the totalizing counters, the disk G will be brought into the zero-position and the cam $g^2$ consequently positioned underneath the arm $n^2$ so that the arm $n^1$ will release the two slide-plates $J^7$, $K^4$ and the locks J and K accordingly. In this position of the disk G, the pin H which serves for simultaneously setting all totalizing counters to zero, lies co-axially with respect to the key-hole $c^4$, so that the simultaneous setting to zero of all totalizing counters can be performed after this key-hole has been uncovered as will be described hereinafter.

The opening of the lock J will cause the locking of the lock K by means of the locking disks $i^1$, $k^1$ and the covering of the key-hole $c^4$ by means of the slide-plate $K^4$. At the same time, the rocking of the latch $J^4$ by means of the pin $i^3$ will cause the release of the drum D and the locking of the keys by means of the slide-plate $J^7$ and the parts $m^1$, M, $m^2$, $m^3$, $m^4$ (Fig. 5). The drum D can now be rotated for the purpose of reading and individually setting the several totalizing counters to zero by moving a key P, which has been inserted into the respective key-hole $b^6$ of the disk $B^5$, through rotation of the latter onto the stop $c^3$ of the casing wall $C^1$. This rotation will bring the said key-hole into alignment with the key-hole $c^2$ of the wall $C^1$ Fig. 17, enabling thereby an insertion of the key into the slot $e^1$ of the respective zero-setting pin E and a rotation to zero of that totalizing counter shaft $F^1$ which, when the totalizing counter is disengaged, is co-axial with the pin E. By the adjustment of the drum D by means of the zero-setting key the respective totalizing counter is moved so as to take a position below a peep-slot $c^6$ of the wall $C^5$ whereby the reading is made possible.

If all of the totalizing counters should be simultaneously set to zero, the arm $n^1$ must have released the two slide-plates $J^7$ and $K^4$, as already described, and the drum D must be locked by the intermediary of the lock J. If, now, the lock K is opened, the locking of the drum will be secured through the locking of the lock J by means of the locking disks $k^1$, $i^1$, and the key-hole $c^4$ (Figs. 1 and 6) will be uncovered by the shifting of the slide-plate $K^4$. The key used for simultaneous zero-setting can now be introduced through the key-holes $b^8$ and $c^4$ into the slot $h^3$ of the pin H, and a full revolution of the pinion $h^1$ can be transmitted through the pinion $b^7$ and the pinions $e^4$ to the shafts $F^1$ of all totalizing counters for the purpose of setting them to zero.

Claims:

1. In a machine of the character described, counting discs, registering mechanisms arranged around said counting discs and adapted to be selectively coupled thereto, a drum adapted to receive said counting discs and registering mechanisms and arranged coaxially with said counting discs, said drum being normally stationary and means for rotating said drum independently of said counting discs for the purpose of reading and for setting said registering mechanisms to zero positions.

2. In a machine of the character described, setting members, a drum adapted to be rotated for the purpose of reading, registering mechanisms and counting disks arranged in the drum, a locking means for the said drum, said locking means being adapted to release the setting members of the machine and lock the drum, and to lock the setting members and release the drum.

3. In a machine of the character described, a casing, a drum normally stationary and adapted to be rotated for the purpose of reading, totalizing counters swingingly arranged in the said drum and comprising each a shaft, counting disks in the drum adapted to be engaged by the totalizing counters, a disk rigidly connected to the drum and serving to adjust the totalizing counters for setting them to zero and reading them, key-holes in said disk, said key-holes being arranged co-axially with relation to the shafts of the totalizing counters when same are disengaged from the counting disks, a stop on one of the casing-walls, a key adapted to be inserted to a certain extent into one of the said key-holes and moved onto the said stop for the purpose of rotating the drum and setting the totalizing counters, and the key being thereafter adapted to be inserted to a larger extent so as to engage with one of the shafts of the totalizing counters for setting the same to zero-position.

4. In a machine of the character described, a casing, a drum normally stationary and adapted to be rotated for the purpose of reading, a series of totalizing counters arranged on a circle in said drum, said counters comprising each a shaft, a train of toothed pinions adapted to be coupled with said shafts for simultaneously moving all totalizing counters into their zero-position, a key for operating the said train of pinions, a key-hole in a wall of the casing for the insertion of the key, a locking device for cooperation with the drum, means in said locking device for covering and uncovering the said key-hole, said means being adapted to uncover the key-hole only in case the drum is locked, and to positively secure the locking of the drum upon the key-hole having been uncovered.

The foregoing specification signed at Essen, Germany, this 3rd day of February, 1922.

ERNST BREITLING.